United States Patent [19]

Blankenship et al.

[11] Patent Number: 5,059,229
[45] Date of Patent: Oct. 22, 1991

[54] METHOD FOR PRODUCING OPTICAL FIBER IN A HYDROGEN ATMOSPHERE TO PREVENT ATTENUATION

[75] Inventors: Michael G. Blankenship, Painted Post; George E. Berkey, Pine City, both of N.Y.

[73] Assignee: Corning Incorporated, Corning, N.Y.

[21] Appl. No.: 586,963

[22] Filed: Sep. 24, 1990

[51] Int. Cl.⁵ .................... C03C 21/00; C03B 37/027
[52] U.S. Cl. ............................................ 65/2; 65/13; 65/32.5
[58] Field of Search .................. 65/2, 3.11, 13, 32.5, 65/30.1, 900, 3.12

[56] References Cited

U.S. PATENT DOCUMENTS

| | | | |
|---|---|---|---|
| 4,553,995 | 11/1985 | Chigusa | 65/4.21 |
| 4,600,422 | 7/1986 | Scott | 65/3.12 |
| 4,659,354 | 4/1987 | Roba | 65/3.12 |
| 4,685,945 | 8/1987 | Freund | 65/2 |
| 4,911,742 | 3/1990 | Newbould et al. | 65/30.1 |
| 4,913,715 | 4/1990 | Jochem et al. | 65/3.11 |

FOREIGN PATENT DOCUMENTS 2149392  6/1985  United Kingdom ............ 65/900

Primary Examiner—Richard V. Fisher
Assistant Examiner—John Hoffmann
Attorney, Agent, or Firm—William J. Simmons, Jr.

[57] ABSTRACT

An optical fiber is drawn from a draw blank that is situated in a furnace muffle. An end of the blank is heated to a temperature sufficient to permit a fiber to be drawn therefrom. During the fiber drawing operation, the blank is subjected to a gas containing an amount of hydrogen sufficient to reduce the number of defects in the fiber. The resultant fiber therefore experiences little or no latent attenuation increase when it is later subjected to a hydrogen containing atmosphere.

15 Claims, 4 Drawing Sheets

METHOD FOR PRODUCING OPTICAL FIBER IN A HYDROGEN ATMOSPHERE TO PREVENT ATTENUATION

BACKGROUND OF THE INVENTION

The present invention relates to a method for producing an optical fiber having reduced hydrogen sensitivity. More particularly, it relates to a method for producing a glass optical fiber having reduced hydrogen attenuation effects in the operating windows in the wavelength ranges 1270–1330 nm and 1520–1580 nm.

The low attenuation and dispersion characteristics of optical fibers have been advantageously employed to form long repeaterless links. In certain instances it is desirable to employ a large percentage of the loss budget made available by the low loss fiber, thereby providing very little safety factor. If, after the fiber is drawn, sufficient attenuation increase occurs at a transmitting wavelength, system operation can be interrupted.

Various kinds of single-mode and multimode optical fibers have been found to exhibit a reversible attenuation increase caused by the permeation of hydrogen gas into the optical fiber after it has been installed. Attenuation increase due to the interaction of hydrogen with the low loss fiber has been known to exist for several years. There are several known hydrogen induced attenuation effects: (1) interstitial hydrogen which is directly proportional to the partial pressure of hydrogen and is reversible; (2) increases in the phosphorous-hydroxyl absorption (1300–2000 nm) which precludes the use of $P_2O_5$ as a dopant except in low (less than 0.1 wt. %) concentrations; (3) under high temperature-long time $H_2$ exposure, there results a high absorption at short wavelengths that has an extensive tail extending through the visible and into the infrared region; and (4) transient absorption that occurs when $H_2$ first arrives in the fiber core region with most notably peaks at 1530, 1330, 1380, and 1440 nm. Effect (4), referred to herein as the transient hydrogen sensitive attenuation phenomenon, is addressed by the method of this invention. A delayed, hydrogen sensitive attenuation increase can occur from a few hours to many days after the fiber has been manufactured, depending on the temperature and the hydrogen partial pressure to which the fiber is subjected. Immediately after the attenuation increase has reached a maximum, it begins to decrease to a residual value that is about 15% of the maximum attenuation increase over the base level. The attenuation increase may occur after the optical fiber has been installed, thereby creating the possibility that the system will be rendered at least temporarily inoperative.

Additional discussion of hydrogen produced attenuation increase can be found in the following publications:

(a) A. Iino et al. "Mechanisms of Hydrogen-Induced Losses in Silica Based Optical Fibers" OFC'90, TUB3, (b) Y. Yokomachi et al. "Hydrogen-Induced Absorption Bands in Silica Core Fibers in the Infrared Region" OFC'89 WQ12, (c) H. Kajioka et al. "Analysis of Drawing-Induced Stress and Loss Mechanisms in Dispersion-Shifted Single-mode Optical Fibers" OFC'88, W13, (d) M.G. Blankenship et al. "Short Term Transient Attenuations in Single-mode Optical Fibers Due to Hydrogen" WA3, OFC/IOOC'87, (e) K. Nagasawa et al. "Effect of Cladding Material on 2-eV Optical Absorption in Pure-Silica Core Fibers and Method to Suppress the Absorption" Japanese Journal of Applied Physics, v.26, No. 1, Jan, 1987, pp. 148–151, (f) H. Bauch et al. "Properties of PICVD-Fibers with Pure $SiO_2$-Core: The Influence of the Preform Collapse Process" Journal of Optical Communications, v. 8 (1987) No. 4, pp. 140–142, (g) P.J. LeMaire et al. "Optical Spectra of Silica Core Optical Fibers Exposed to Hydrogen" Mat. Res. Co. Symp. Proc., vol. 88, (h) K. Nagasawa et al. "Effect of Oxygen Content on Defect Formation in Pure-Silica Core Fibers" Japanese Journal of Applied Physics, vol. 26, No. 5, May 1987, pp L554–L557, (i) K. Noguchi et al. "Loss Increase For Optical Fibers Exposed to Hydrogen Atomsphere" Journal of Lightwave Technology, vol. Lt-3, No. 2, April 1985, and (j) K. Nagasawa et al. "The 1.52 $\mu m$ Absorption Band Induced by Hydrogen Treatment in Optical Fibers" OFC/IOOC 1987, WA4.

The effect of hydrogen on a particular optical fiber will be described in order to graphically illustrate the transient hydrogen sensitive attenuation phenomenon. Single-mode fibers having cores of silica doped with 20 wt. % $GeO_2$ (0.96% delta) were studied in order to characterize the transient hydrogen sensitive attenuation phenomenon. Fibers having 1.1 km lengths were placed in room temperature chambers containing $10^{-4}$ atmosphere hydrogen to 1.0 atmosphere hydrogen. A delayed, hydrogen sensitive attenuation increase occurred from a few hours to many days after a fiber had been manufactured, depending on the hydrogen partial pressure to which a fiber was subjected. Since the diffusion of hydrogen to the light propagating region of the affected fiber initiates the attenuation increase, temperature is also a factor. FIG. 1 shows spectral attenuation curves for a fiber that is relatively sensitive to hydrogen. Curve 10 illustrates the spectral attenuation of the fiber immediately after it was drawn. As illustrated by curve 11, the fiber experienced attenuation increases at 1330 nm, 1440 nm and 1530 nm after exposure to 0.1% hydrogen for 25 days. Attenuation increased from about 0.2 dB/km to almost 1 dB/km at 1530 nm. Curve 12 shows that after 153 days, attenuation decreased from its maximum value, but it never decreased to its as-drawn value at 1530 nm. Its residual value at that wavelength is about 0.3 dB/km.

Curves 16 and 17 of FIG. 2 illustrate the manner in which attenuation increases with respect to time for this type of fiber at two of the affected wavelengths, 1530 nm and 1380 nm, respectively. The fiber is drawn at time $t_0$. Very little attenuation increase above the base value of $A_i$ occurs between times $t_0$ and $t_d$. Attenuation rapidly increases between times $t_d$ and $t_m$, at which time a maximum attenuation $A_m$ occurs. The term $A_{m(1530)}$, for example, refers to the maximum attenuation at 1530 nm. Thereafter, attenuation gradually decreases to a residual value at time $t_r$. The residual attenuation $A_r$ is about 15% of the maximum attenuation increase $A_m$.

This transient attenuation increase mechanism has what appears to be a diffusion period of several days to several hundreds of days, depending upon hydrogen concentration and ambient temperature. The diffusion period is given by the following equation:

$$t_d = 4.4 \times 10^{-8} \times (+0.015/P) \times e^{(5234/T)}$$

where t is time in days, P is partial pressure of hydrogen 25 in atmospheres, and T is temperature in Kelvin.

FIG. 3 schematically illustrates the occurrence of the hydrogen diffusion/reaction process within a cross-section of fiber 20. Defect sites 21, 21' can be located in core 22, cladding 23 or both. It is hypothesized that these defect sites are formed under certain drawing conditions. The concentration of defect sites within the experimental glass fiber samples tested which react with hydrogen was typically less than 100 ppb.

An installed optical fiber is subjected to some source of hydrogen such as air or other atmosphere that surrounds the fiber. Hydrogen molecules 24 diffuse inwardly from the hydrogen source 25 outside the cladding 23. As molecules 24 begin to diffuse inwardly from the cladding surface, they react with defect sites to form reacted sites 21' which are located beyond some radius represented by dashed line 26. Time delay $t_d$ of FIG. 2 results from the diffusion time of the hydrogen molecules along with the reactive consumption of the hydrogen molecules at reactive defect sites in the cladding glass until the hydrogen reaches the light propagating region of the fiber. After the hydrogen molecules have reacted with essentially all of the defect sites at locations of radii beyond the light propagation region of the fiber, they begin to react with sites that are located in the light propagation region, thereby causing an attenuation increase.

The magnitude of the attenuation increase, which appears to be related to the number of defects in the light propagating region of the fiber, has been known to increase the attenuation from a base value less than about 0.2 dB/km to more than 1.0 dB/km at 1530 nm. The maximum transient attenuation lasts for only a few hours at room temperature. The aforementioned Nagasawa et al. OFC/IOOC '87 publication suggests that the attenuation increase is due to a weakened H—H bond when a hydrogen bond is formed with a peroxy radical. The present method should therefore be effective to reduce attenuation in germanate as well as silicate glasses since both of these kinds of glasses contain peroxy radicals.

SUMMARY OF THE INVENTION

An object of the present invention is to provide a method for producing an optical fiber wherein the temporary attenuation increase due to hydrogen diffusion into the core is reduced to the extent that it has no practical significance. Another object is to provide a method for producing an optical fiber having reduced residual attenuation.

Briefly, the present invention relates to a method of manufacturing an optical fiber that is protected at least partially from latent attenuation increase due to hydrogen. The drawn optical fiber is subjected to a hydrogen-containing gas that can be present in the draw furnace and/or in a tube immediately adjacent the furnace. The gas contains an amount of hydrogen sufficient to form an optical fiber that experiences little or no attenuation increase at 1530 nm when it is subjected to hydrogen after it is drawn. Also, attenuation of the fiber, as drawn, is improved in the 600–800 nm wavelength range. The draw gas should contain at least 0.1 volume percent hydrogen to be effective.

In conventional draw furnaces, the maximum concentration of hydrogen in the draw gas is should be limited to a value that is insufficient to cause the residual hydrogen in the gas exiting from the furnace to violently react with oxygen in the ambient atmosphere. Thus, the draw gas can contain up to about 12 volume percent hydrogen without employing a draw furnace having special precautions. If such precautions are designed into the draw furnace, the draw gas can in up to 100 percent hydrogen. For example, the furnace could contain means for exhausting the draw gas from the furnace and means for preventing the flow of air into the furnace.

DESCRIPTION OF THE PREFERRED EMBODIMENTS

Figure 1:
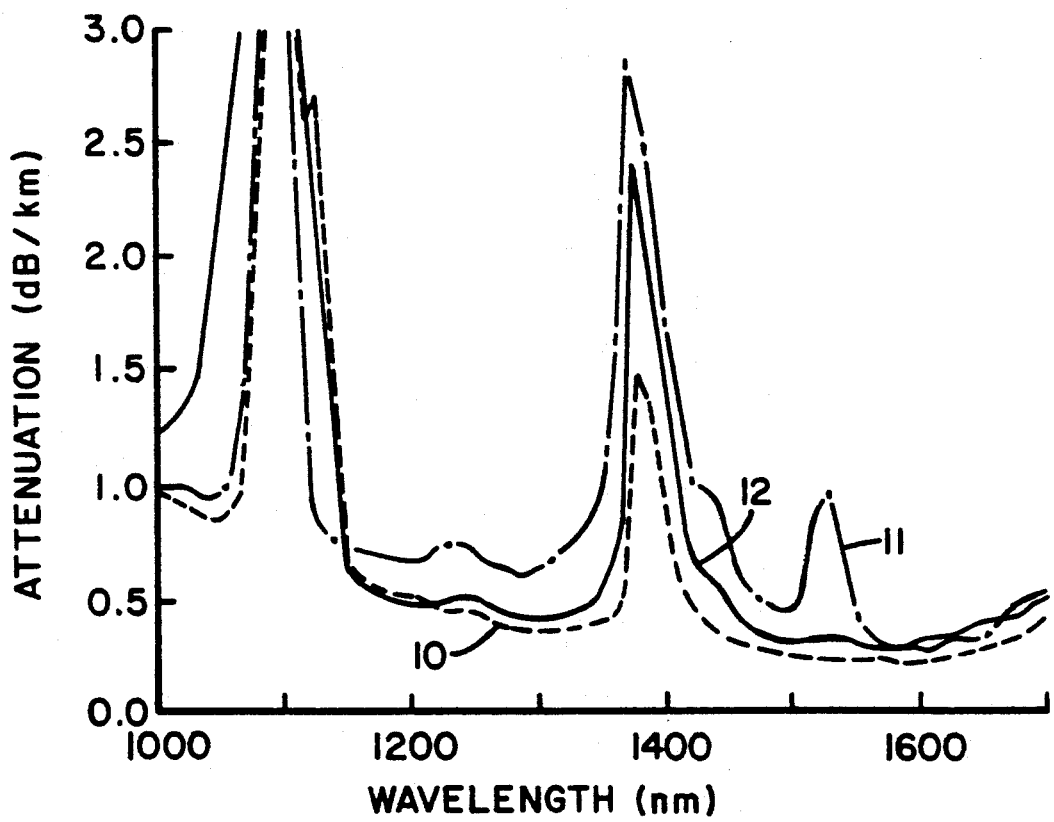
FIG. 1 is a graph illustrating the spectral attenuation of an optical fiber as-drawn and after being subjected to 0.1% hydrogen for 25 and 153 days.
Figure 3:
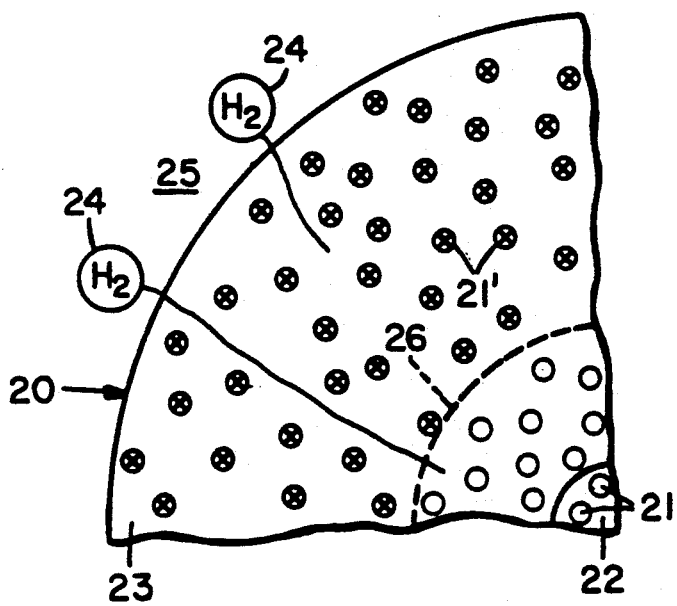
FIG. 3 is a schematic illustration of the diffusion of hydrogen into an optical fiber.
Figure 2:
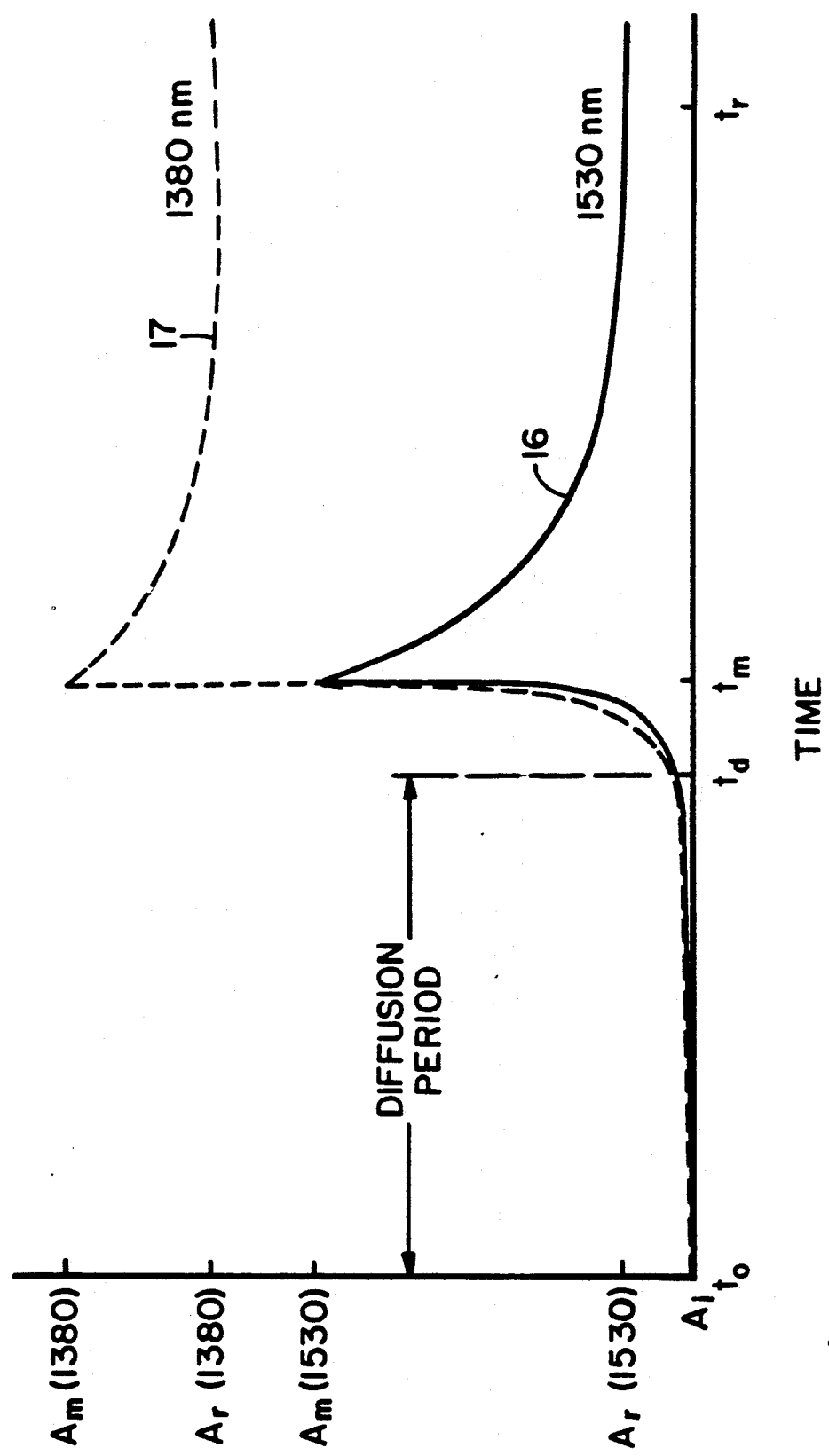
FIG. 2 shows the attenuation increase with respect to time at 1530 and 1380 nm.
Figure 4:
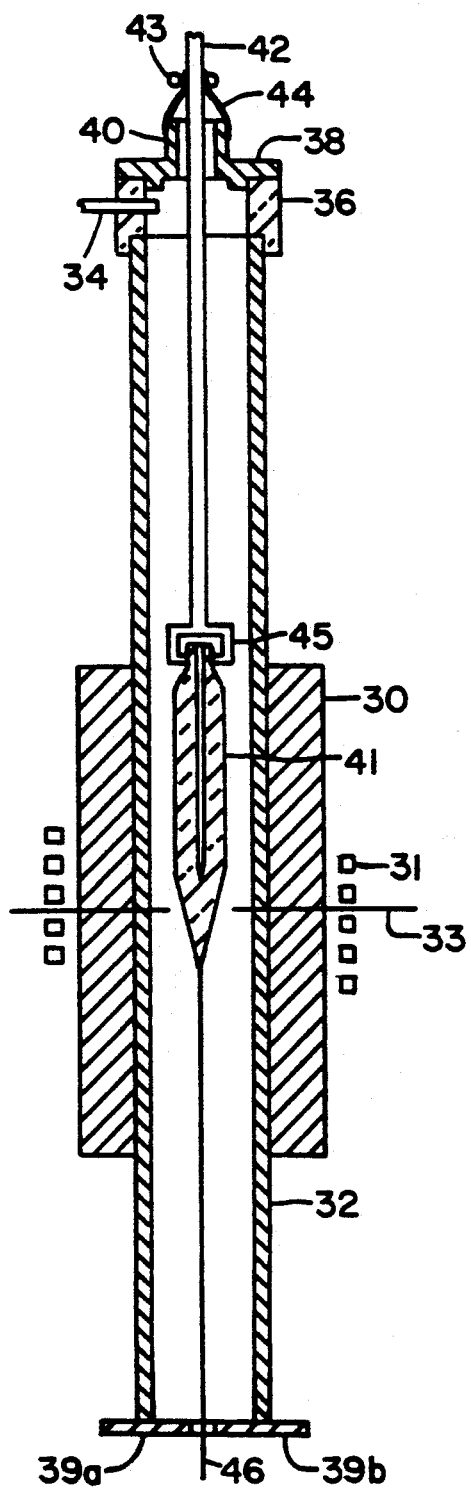
FIG. 4 is a schematic illustration of an optical fiber draw furnace.

In accordance with the present invention, the transient, hydrogen-sensitive attenuation phenomenon can be eliminated or substantially reduced, i.e. it can be reduced to the extent that it is of no practical significance, by drawing the fiber in a hydrogen containing atmosphere. FIG. 4 illustrates the essential portion of a draw furnace that can be employed to carry out the present method. Insulation 30 and radio frequency coil 31 surround a portion of muffle 32 which is formed of a susceptor material such as zirconia. Broken line 33 represents the zone of highest temperature generated within the muffle.

A pipe 34 for supplying gas to muffle 32 extends through annular member 36 which is situated on top of muffle 32. End cap 38, which is sealed to member 36, includes a sleeve 40 through which blank support rod 42 extends. Sealing member 44 of metallic foil or the like surrounds sleeve 40 and the adjacent portion of rod 42, to which it is sealed by O-ring 43. That end of muffle 32 from which fiber 46 is drawn can be provided with iris means 39a, 39b. The aperture in the iris means is initially large but is narrowed after the fiber drawing process begins.

Draw blank 41 can be made by any known technique such as modified chemical vapor deposition (MCVD), vapor axial deposition (VAD) and outside vapor deposition (OVD); fibers drawn from blanks produced by all of these processes can be affected by the transient, hydrogen-sensitive attenuation phenomenon. Blank 41 is secured to rod 42 by any well known means such as slotted glass handle 45. During the process of drawing the optical waveguide fiber 46, rod 42 descends slowly through muffle 32 to maintain the root portion of fiber 46 and the tapered portion of blank 41 at the proper temperatures for drawing. The drawing temperature depends upon the composition of the blank, temperatures between 2050° C. and 2150° C. being common for high silica content blanks.

It has been conventional practice to flow helium along with inert gas and/or oxygen over the preform or draw blank during the drawing process to accomplish one or more of the following: (a) minimize fiber diameter variations, (b) assure oxidation of contaminants in fiber 46, (c) control or eliminate updrafts of air which would tend to flow up through the heated muffle, and (d) flush out materials evolving from the heated blank and muffle. Argon is recommended for use in certain furnaces to prevent oxidation of carbon heating elements. In the furnace of FIG. 4, these gases are introduced through pipe 34 and into member 36, and since this end of the muffle is sealed by members 36, 38, 40 and 44, they flow down through the muffle past blank 41 and are exhausted at the bottom of the muffle. Gases have been introduced at other locations along the muffle, eg. near the bottom or in the region of the heating element.

In accordance with the present invention, the draw gas flowing over the draw blank during the fiber drawing process contains a sufficient amount of hydrogen to stabilize the fiber with respect to subsequent hydrogen attenuation increases. The draw gas mixture should contain at least 0.1 volume percent hydrogen in order to be effective. The balance of the draw gas mixture may be an inert gas, such as helium, argon, nitrogen, or the like, and it may optionally contain a reactive gas such as air, oxygen or the like depending upon the composition of the fiber. The preferred draw gas comprises a mixture of helium and hydrogen. Since hydrogen is highly reactive with oxygen, the maximum concentration of hydrogen in the draw furnace should be about 12 volume percent if the furnace does not contain means for excluding air or oxygen. Care should be taken to determine the maximum safe hydrogen concentration for any particular furnace design. Hydrogen which is present in the high temperature draw furnace rapidly diffuses into the fiber where it remains essentially trapped and reactive with defect sites as the fiber cools.

Figure 4A:
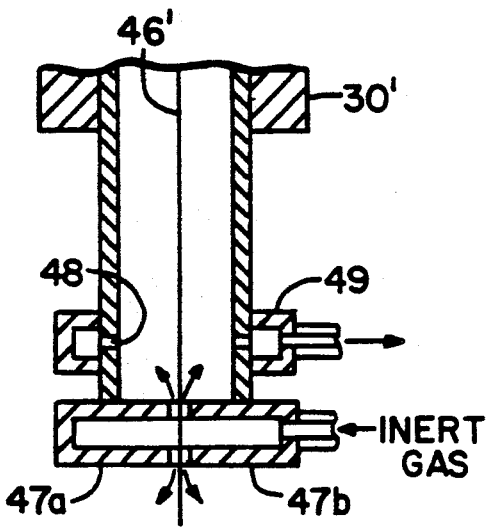
FIGS. 4a and 4b schematically illustrate modifications of the furnace of FIG. 4.

If the furnace were designed with sufficient precautions for excluding air, the amount of hydrogen could be increased to concentrations up to 100 percent. One such embodiment is shown in FIG. 4a wherein elements similar to those shown in FIG. 4 are represented by primed reference numerals. After the drawing operation is initiated, gas chamber sections 47a and 47b can be joined to form a gas lock to which inert gas is supplied. During the fiber draw operation, the inert gas flows through the top and bottom apertures of chamber 47a, 47b. The flow of inert gas from the bottom gas chamber aperture excludes air from the furnace. The hydrogen draw gas along with the remainder of the inert gas from chamber 47a, 47b is vented through apertures 48 and exhaust manifold 49.

Figure 4B:
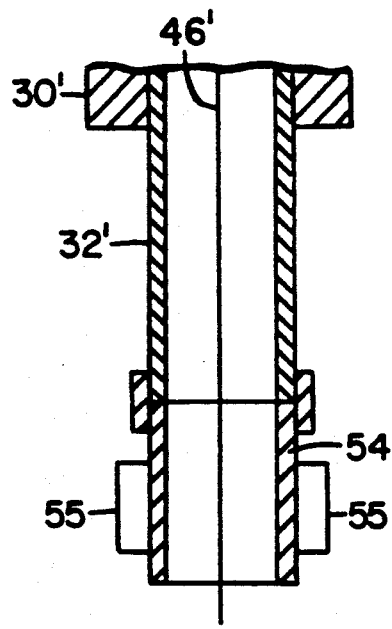

For a given fiber diameter one can experimentally determine the optimum conditions of temperature, residence time and hydrogen concentration that will result in the formation of an optical fiber which will exhibit little or no transient, hydrogen-sensitive attenuation increase. Residence time can be increased by lowering draw rate. At a given draw rate, fiber residence time can be increased by adding an extension to the furnace. Residence time can also be increased by employing an apparatus shown in FIG. 4b wherein elements similar to those shown in FIG. 4 are represented by primed reference numerals. Heating means 55 surrounds furnace extension 54 through which fiber 46' passes after it exits furnace muffle 32'. The fiber is subjected to an elevated temperature as it passes through extension 55. Since hydrogen flows from the muffle and through the extension, the time period during which the fiber is subjected to hydrogen at an elevated temperature is increased.

The following specific examples illustrate the manner in which the method of the present invention can be employed to produce optical fibers having a reduced number of defects of the type that would result in a latent attenuation increase due to hydrogen. Optical fiber draw blanks for both examples were formed by a method similar to that disclosed in U.S. Pat. No. 4,486,212 which is incorporated herein by reference.

Figure 5:
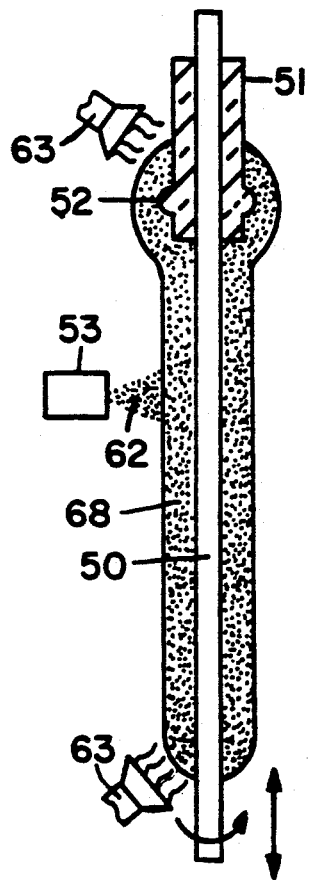
FIG. 5 illustrates the application of successive coatings of glass particles to a mandrel.

Referring to FIG. 5, the large diameter end of an alumina mandrel 50 was inserted into glass tube 51 having protrusions 52. The outside diameter of the mandrel tapered from 5.5 mm to 6.5 mm over its 107 cm length. The ends of mandrel 50 were mounted in a lathe where it was rotated and translated.

Figure 6:
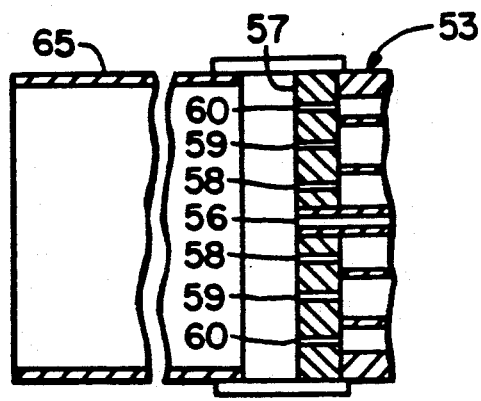
FIG. 6 is a fragmentary cross-sectional view of a conventional flame hydrolysis burner.

Burner 53 was positioned 13.7 cm from mandrel 50. Orifice 56, centrally located in burner face 57 (see FIG. 6), is surrounded by concentric rings of orifices 58, 59 and 60. Reactant compounds emanate from orifice 56 where they are heated by a flame produced by fuel gas and oxygen emanating from orifices 59. The reactant compounds oxidize in the flame to form glass particle stream 62 which is directed toward mandrel 50. An "inner shield" of oxygen emanates from orifices 58 to prevent the reaction of reactant compounds at the burner face. An "outer shield" stream of oxygen emanates from orifices 60. This burner design is somewhat similar to that disclosed in U.S. Pat. No. 3,698,936 issued to H.J. Moltzan, the Moltzan patent differing in that it teaches an annular slot for providing the inner shield stream and in that it lacks the outer shield orifices. All of the orifices of burner 53 are supplied by manifolds in a manner similar to that taught in the Moltzan patent. The axes of orifices 58, 59 and 60 are slightly angled or focused so gases emanating therefrom are directed toward the reactant compounds emanating from orifice 56.

Auxiliary burners 63 directed flames toward the ends of the porous glass preform during deposition. The use of auxiliary burners is taught in U.S. Pat. No. 4,810,276.

Figure 7:
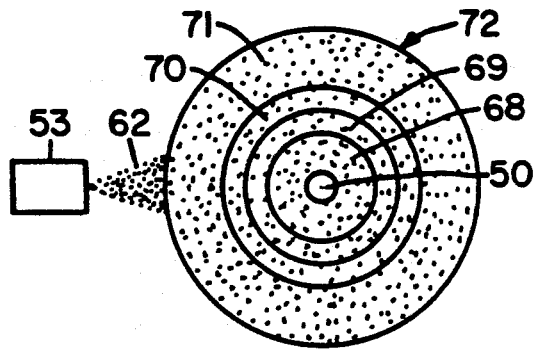
FIG. 7 illustrates the application of additional coatings of glass particles to a mandrel.

The system for delivering the gas-vapor mixture to the burner was similar to that disclosed in U.S. Pat. No. 4,314,837. Liquid $SiCl_4$ was maintained at 79° C. in a first container, and liquid $GeCl_4$ was maintained at 100° C. in second container, thus producing vapor at about 20 psi. During the deposition of coatings 68 through 71 (FIG. 7), vapors were metered from the first and second containers and were premixed with oxygen before being supplied to burner orifice 56. The burner traversed a 70 cm section of mandrel in 30 seconds.

An acetylene torch supported on the burner was first employed to deposit carbon particles on the mandrel during one burner pass to facilitate removal of the porous preform. A porous glass core preform 72 was then formed by traversing burner 53 along mandrel 50 for 400 minutes. Each coating was formed by traversing the mandrel many times with respect to burner 53 to cause a build-up of many layers of glass particles. The burner made additional passes in the vicinity of protrusions 52 in order to strengthen the bond between the tube and preform. During the deposition of preform 72, SiCl₄ was ramped from 2.6 slpm to 4 slpm during the first 274 minutes, and it remained constant for the remainder of the run. During the formation of coating 68, GeCl₄ initially flowed to the burner at a rate of 0.4 slpm, and it decreased linearly to 0.1 slpm during the first 108 minutes. The GeCl₄ then further decreased to zero during the next 11 minutes. Coating 69 was formed by flowing only SiCl₄ to the burner for the next 84 minutes. During the formation of coating 70, GeCl₄ was ramped from zero to 0.2 slpm in 8 minutes, it remained constant for about 10 minutes, and it was linearly ramped to zero during the next 11 minutes. Another coating of SiO₂ was deposited by flowing only SiCl₄ to the burner for the last 168 minutes of the run.

The preform was removed from the lathe, and the mandrel was removed through tube 51, thereby leaving a longitudinal aperture in the porous preform. Protrusions 52 caused tube 51 to adhere to the preform; that tube remained at one end of the preform to provide support for subsequent processing. The preform was then dried and consolidated in accordance with the teachings of U.S. Pat. No. 4,125,388 (Powers 2A). A drying gas consisting of 5 volume percent chlorine and 95 volume percent helium was flowed through tube 51 and into the preform aperture. A helium flushing gas flowed upwardly through the muffle. The preform was gradually lowered into a consolidation furnace muffle, thereby forming consolidated preform 75.

The difference between the thermal coefficients of expansion of the core and cladding regions of consolidated preform 75 was sufficiently great that breakage could occur if the preform was permitted to cool to room temperature. This problem was overcome by stretching the preform before its temperature had decreased to the critically low value.

Figure 8:
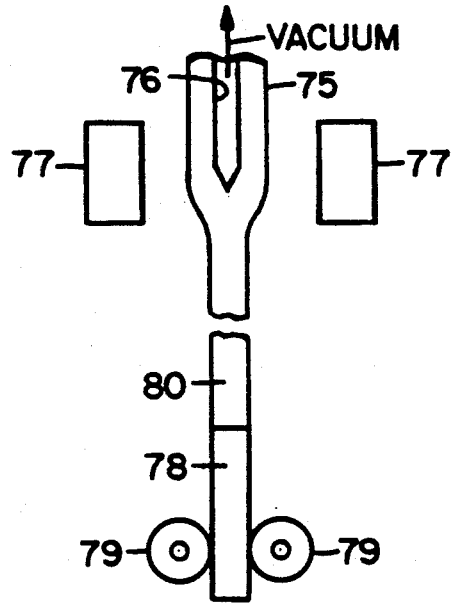
FIG. 8 is a schematic diagram illustrating the drawing of a rod from the consolidated preform.

Consolidated preform 75 was inserted into the apparatus of FIG. 8, a conventional draw furnace wherein the tip of preform 75 was heated by means 77 to 1900°. A vacuum connection was affixed to the upper end of the preform. One end of silica rod 78 was fused to the lower end of the preform, and the other end of the rod was engaged by motor-driven tractors 79, thereby causing rod 80 to be drawn from preform. After the end of preform 75 was stretched so that aperture 76 was either very narrow or completely closed, the aperture was evacuated. As the lower end of the preform was pulled downwardly at a rate of about 15 cm/min, and its diameter decreased, the evacuated aperture 76 collapsed. The diameter of the resultant rod 78 was 7 mm.

Figure 9:
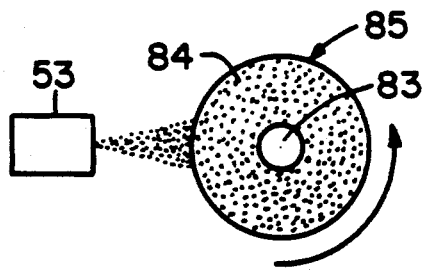
FIG. 9 illustrates the application of a coating of cladding glass particles to the rod produced by the method of FIG. 8.

A plurality of 90 cm sections were severed from rod 78, and each section 83 was supported in a lathe where it functioned as a mandrel for the deposition of additional cladding glass particles (FIG. 9). During the deposition of outer cladding coating 84, the flow of SiCl₄ vapor was linearly ramped from 2.5 to 4.5 slpm for about 400 minutes. During this deposition sequence, burner 53 traversed rod 83 at a rate of about 2 cm/sec. This overclad process continued until a coating of SiO₂ particles having an outside diameter of 60 mm was deposited to form composite preform 85. Each preform was gradually inserted into a consolidation furnace muffle where it was consolidated at a maximum temperature of 1450° C. while a mixture of 98.75 volume percent helium and 1.25 volume percent chlorine flowed upwardly through the muffle. A plurality of optical fiber draw blanks, including draw blanks A and B, each having a diameter of about 35 mm, were formed from a single consolidated core preform 75.

EXAMPLE 1

Draw blank A was inserted into a draw furnace which was similar to that illustrated in FIG. 4. The inside diameter of the furnace muffle was 66 mm, and the maximum temperature at line 33 was about 2050° C. A plurality of 5 km lengths of single-mode fiber having an outside diameter of 125 μm were drawn at a rate of 2.5 meters per second.

During the drawing of fiber from the bottom half of the draw blank, a gas mixture consisting of 2.0 slpm helium and 0.25 slpm hydrogen was flowed into pipe 34 and downwardly over the blank. The draw gas mixture thus contained 11.1 volume percent hydrogen. One of these fibers is designated fiber A.

For comparison purposes, the second half of the draw blank was drawn under similar conditions except that a draw gas consisting of 2.0 lpm helium flowed into pipe 34. One of these fibers is designated fiber B.

Figure 10:
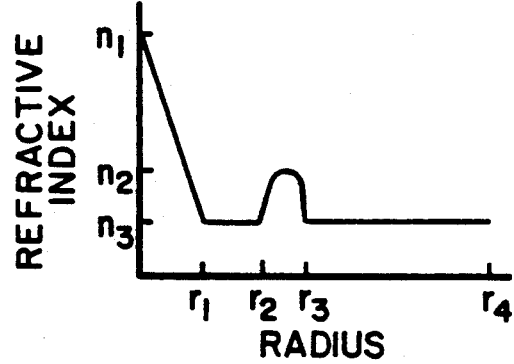
FIG. 10 is a refractive index profile of the resultant fiber.

The refractive index profile of fibers A and B is shown in FIG. 10. The maximum concentration of GeO₂ in the inner core region was about 20 wt %, thereby providing a delta of 0.96% with respect to the silica cladding. The ring of increased refractive index between $r_2$ and $r_3$ had a GeO₂ concentration of about 4.6 wt % and exhibited a delta of about 0.22% with respect to the cladding. Radii $r_1$, $r_2$, $r_3$ and $r_4$ were 4.3 μm, 8 μm, 9.6 μm and 125 μm, respectively.

Measurements at 1380 nm indicated that fibers A and B contained 24 ppb water and 27 ppb water, respectively, thereby indicating that drawing the fiber in hydrogen did not increase the water content of the fiber.

Fibers A and B exhibited as-drawn attenuations of 7.53 dB/km and 9.56 dB/km, respectively at 630 nm. Attenuation at 630 nm due to Rayleigh scattering is 6.3 dB/km, and attenuation in excess of 6.3 dB/km is called the 630 nm excess attenuation. It has been known that the measured 630 nm excess attenuation can be used to provide an indication of the number of defect sites in an as-drawn fiber and to provide a means for predicting the maximum attenuation increase which will occur at 1530 nm and 1380 nm due to the transient, hydrogen aging phenomenon. The 630 nm excess attenuations of fibers A and B were 1.23 dB/km and 3.26 dB/km, respectively. This difference in attenuation was a clear indication that hydrogen treated fiber A would have fewer broken silicon-oxygen bonds, fewer peroxy radicals and would be more resistant to increased attenuation due to hydrogen aging than fiber B. The present method should be able to consistently produce silicate optical fibers having an attenuation lower than 8 dB/km at 630 nm.

Fibers A and B exhibited an attenuation of about 0.2 dB/km at 1530 nm when they were drawn. The 1530 nm attenuation of fiber A (drawn with a hydrogen mixture) increased 0.006 dB/km after 35 hours exposure to a 1% hydrogen atmosphere. The attenuation of fiber B (drawn without hydrogen) increased by 0.112 dB/km after 79 hours. The lower 1530 nm attenuation increase and the much shorter time required for fiber A to reach maximum attenuation indicates that fiber A had many fewer hydrogen reactive defect sites than fiber B.

EXAMPLE 2

Draw blank B was drawn at a faster rate of 10 m/sec into optical fiber in the furnace employed for drawing the fiber of Example 1. During the drawing of fiber from the bottom half of the draw blank, 2.0 slpm helium was flowed into pipe 34 and downwardly over the blank. One of the 5 km long fibers produced from the first half of the blank is designated fiber C. The second half of the draw blank was drawn under similar conditions except that a gas mixture consisting of 96.1 volume percent helium and 3.9 volume percent hydrogen was flowed into pipe 34 and downwardly over the blank at a rate of 2.0 slpm. One of these 5 km long fibers is designated fiber D. The dimensions and refractive index profiles of fibers C and D were the same as those of fibers A and B.

Fiber C exhibited an attenuation increase of 0.290 dB/km at 1530 nm after 89 hours. Hydrogen treated fiber D exhibited an attenuation increase of 0.007 dB/km at 1530 nm after 58 hours. This example shows that the hydrogen treatment of a fiber during draw is effective in reducing the transient hydrogen attenuation phenomenon at relatively high draw rates and at lower hydrogen concentrations.

We claim:

1. A method of manufacturing a silica based optical fiber that is protected at least partially from latent attenuation increase due to hydrogen comprising drawing said optical fiber from a draw blank while a hydrogen ($H_2$)-containing gas is present in the draw furnace, a tapered root forming a transition between said draw blank and said fiber, said gas flowing over said root and over that portion of said fiber adjacent said root and being exhausted from said furnace, whereby that portion of said fiber over which said gas flows is subjected to draw temperature, said fiber being pulled from an end of said furnace, said gas containing an amount of hydrogen sufficient to form an optical fiber that exhibits an attenuation of less than 8 db/km at 630 nm at the time that it is drawn.

2. A method in accordance with claim 1 wherein the major constituent of said gas is helium.

3. A method in accordance with claim 2 which said gas consists of helium and hydrogen.

4. A method in accordance with claim 1 wherein said gas comprises a mixture of hydrogen and another gas selected from the group consisting of argon, helium, oxygen, air and mixtures thereof.

5. A method in accordance with claim 1 wherein said gas flows into said furnace at that end of said draw blank opposite that from which said fiber exits as it is drawn, said gas flowing over said draw blank, over the root between said draw blank and fiber, over said fiber, and from said furnace.

6. A method in accordance with claim 5 wherein said gas further flows from that end of said furnace from which said fiber exits and thereafter flows over said fiber as said fiber passes through a heated tubular member affixed to that end of said furnace from which said fiber is drawn.

7. A method in accordance with claim 1 wherein said gas consists essentially of an inert gas and hydrogen.

8. A method of manufacturing silicate optical fibers comprising the steps of heating a draw blank in a draw furnace to the fiber drawing temperature, said draw blank having a silicate core glass region and a silicate cladding glass region, one of said core and cladding regions containing a dopant which causes the refractive index of the core region to exceed that of the cladding region, drawing said draw blank to reduce the diameter thereof and to form an optical fiber, a portion of said optical fiber and neckdown region between said fiber and said draw blank being situated in said furnace, subjecting said draw blank, said neckdown region and said portion of said optical fiber to a gas containing an amount of hydrogen ($H_2$) sufficient to form an optical fiber that exhibits an attenuation of less than 8 db/km at 630 nm at the time that it is drawn, whereby that portion of said fiber over which said gas flows is subjected to draw temperature.

9. A method in accordance with claim 8 wherein said gas contains up to 12 volume percent hydrogen.

10. A method in accordance with claim 8 wherein said gas contains up to 100 percent hydrogen, said method further comprising the step of exhausting said gas from said furnace and preventing the flow of air into said furnace.

11. A method in accordance with claim 8 wherein the major constituent of said gas is helium.

12. A method in accordance with claim 8 which said gas consists of helium and hydrogen.

13. A method in accordance with claim 7 wherein said gas comprises at least 0.1 volume percent hydrogen.

14. A method in accordance with claim 7 wherein said gas flows from that end of said furnace from which said fiber is drawn.

15. A method in accordance with claim 7 wherein said gas consists essentially of an inert gas and hydrogen.

* * * * *